US011455361B2

(12) United States Patent
Huang et al.

(10) Patent No.: US 11,455,361 B2
(45) Date of Patent: Sep. 27, 2022

(54) QUERY ENTITY-EXPERIENCE CLASSIFICATION

(71) Applicant: MICROSOFT TECHNOLOGY LICENSING, LLC, Redmond, WA (US)

(72) Inventors: Zicheng Huang, Bothell, WA (US); Sharath Rao, Bellevue, WA (US); Chao Gao, Medina, WA (US); Guihong Cao, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 308 days.

(21) Appl. No.: 16/536,827

(22) Filed: Aug. 9, 2019

(65) Prior Publication Data

US 2021/0042372 A1    Feb. 11, 2021

(51) Int. Cl.
*G06F 16/9538* (2019.01)
*G06F 16/953* (2019.01)
*G06F 16/9032* (2019.01)
*G06K 9/62* (2022.01)
*G06N 20/00* (2019.01)

(52) U.S. Cl.
CPC .... *G06F 16/9538* (2019.01); *G06F 16/90332* (2019.01); *G06F 16/953* (2019.01); *G06K 9/6267* (2013.01); *G06N 20/00* (2019.01)

(58) Field of Classification Search
CPC .......................... G06F 16/248; G06F 16/9538
See application file for complete search history.

(56) References Cited

U.S. PATENT DOCUMENTS

| 8,661,050 | B2* | 2/2014 | Varshavsky | G06Q 30/02 707/765 |
| 9,081,814 | B1* | 7/2015 | Carroll | G06F 40/295 |
| 9,659,056 | B1* | 5/2017 | Chechik | G06F 16/2462 |
| 10,621,191 | B2* | 4/2020 | Judd | G06F 16/248 |

(Continued)

FOREIGN PATENT DOCUMENTS

WO    WO-2020226615 A1 * 11/2020    ....... G06F 16/24575

*Primary Examiner* — William Spieler
(74) *Attorney, Agent, or Firm* — Shook, Hardy & Bacon, LLP

(57) ABSTRACT

The technology described herein makes improved use of limited screen space on a search results page by determining whether to present a question-and-answer experience and/or an entity details experience. This determination effects the amount of information presented and the format in which it is presented. In general, the question-and-answer experience provides less information and is more targeted to a question and query terms other than the entity. In contrast, the entity details experience provides more information about the entity that is not tailored to the query beyond the entity being included in the query. In one aspect, the determination of whether to show a question-and-answer experience and/or an entity details experience is based, at least in part, on an entity-details intent classification score ("intent classification score") generated by a machine classification system. The classification score may be processed in combination with other criteria to make a final determination.

20 Claims, 8 Drawing Sheets

(56) References Cited

U.S. PATENT DOCUMENTS

| | | | | |
|---|---|---|---|---|
| 2013/0110825 | A1* | 5/2013 | Henry | G06F 16/345 |
| | | | | 707/723 |
| 2014/0320499 | A1* | 10/2014 | Hogue | G06F 16/248 |
| | | | | 345/440 |
| 2014/0324825 | A1* | 10/2014 | Gopinath | G06F 16/3338 |
| | | | | 707/722 |
| 2015/0161131 | A1* | 6/2015 | Provine | G06F 16/248 |
| | | | | 707/731 |
| 2015/0317365 | A1* | 11/2015 | Andress | G06F 40/14 |
| | | | | 707/722 |
| 2018/0113865 | A1* | 4/2018 | Najork | G06F 16/24565 |
| 2019/0034500 | A1* | 1/2019 | Das | G06N 5/022 |
| 2019/0205476 | A1* | 7/2019 | Jagadeesan | G06Q 30/0201 |

* cited by examiner

FIG. 3

QUERY ENTITY-EXPERIENCE CLASSIFICATION

CROSS REFERENCE TO RELATED APPLICATIONS

Background

Search engines receive queries and provide search results that are responsive to a query provided by a user. The search engine can process the query, user data, contextual data, and other inputs to identify the most relevant content for the particular query. The content can be presented to the user in several different forms on a search results page. The content can be presented as links to webpages, a question-and-answer experience, an entity details experience, or in some other form. The search results page has a limited amount of screen space, especially when the results are presented on a mobile phone or other device with a comparatively small screen. Users become frustrated when unwanted search results and or user experiences are presented, instead of, or even in addition to, the search results and user experiences sought.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Aspects of the technology described herein make improved use of limited screen space on a search results page by determining whether to present a question-and-answer experience and/or an entity details experience. This determination effects the amount of information presented and the format in which it is presented. In general, the question-and-answer experience provides less information and is more targeted to a question and/or query terms other than the entity. In contrast, the entity details experience provides more information about the entity that is not tailored to the query beyond the entity being included in the query. The search results page may be a webpage displayed through a browser. The search results page may also be a page displayed through an application, such as a personal assistant application, navigation application, shopping application, and the like.

In one aspect, the determination of whether to show a question-and-answer experience and/or an entity details experience is based, at least in part, on an entity-details intent classification score ("intent classification score") generated by a machine classification system, such as a neural network or support vector machine (SVP). The machine classification system is trained using queries labeled as having an entity-details intent or not having an entity-details intent. Once trained, the machine classification system can assign an intent classification score to an unlabeled query. The intent classification score can be a confidence score indicating a degree of confidence the machine classification system assigns to the query that an entity-details experience should be shown in response to the query. Conceptually, a high score means that the new query has a high level of similarity to training data labeled with an entity-details intent. A low score means the opposite.

The intent score may be used in combination with various rules to determine whether an available question-and-answer experience is presented to the user. In one aspect, two different intent-score-based rules are used to determine whether an entity-details intent exists. If either of the two intent-score-based rules determines that entity-details intent exists, then an available Q&A experience is not presented and only the entity-details experience is presented. As described subsequently, other rules that do not rely on the intent score may be used to determine that entity-details intent exists.

In addition to the intent-score-based rules, content-based rules may be used to determine that an entity-details intent exists. In one aspect, two different content-based rules are used to determine whether an entity-details intent exists. If either of the two content-based rules determines that entity-details intent exists, then an available Q&A experience is not presented and only the entity-details experience is presented.

Thus, aspects of the technology may use four or more different rules to find an entity-details intent. If any one or more of the rules is satisfied, then the intent is found. The rules may be evaluated in series or in parallel. If in series, then subsequent rules in the series need not be evaluated when a precedent rule finds an entity-details intent. If in parallel, then processing of other rules may stop when a rule finds an entity-details intent.

BRIEF DESCRIPTION OF THE DRAWINGS

Aspects of the invention are described in detail below with reference to the attached drawing figures, wherein:

FIG. 3 is a diagram showing a question and answer experience, according to an aspect of the technology described herein;

DETAILED DESCRIPTION

Figure 1:
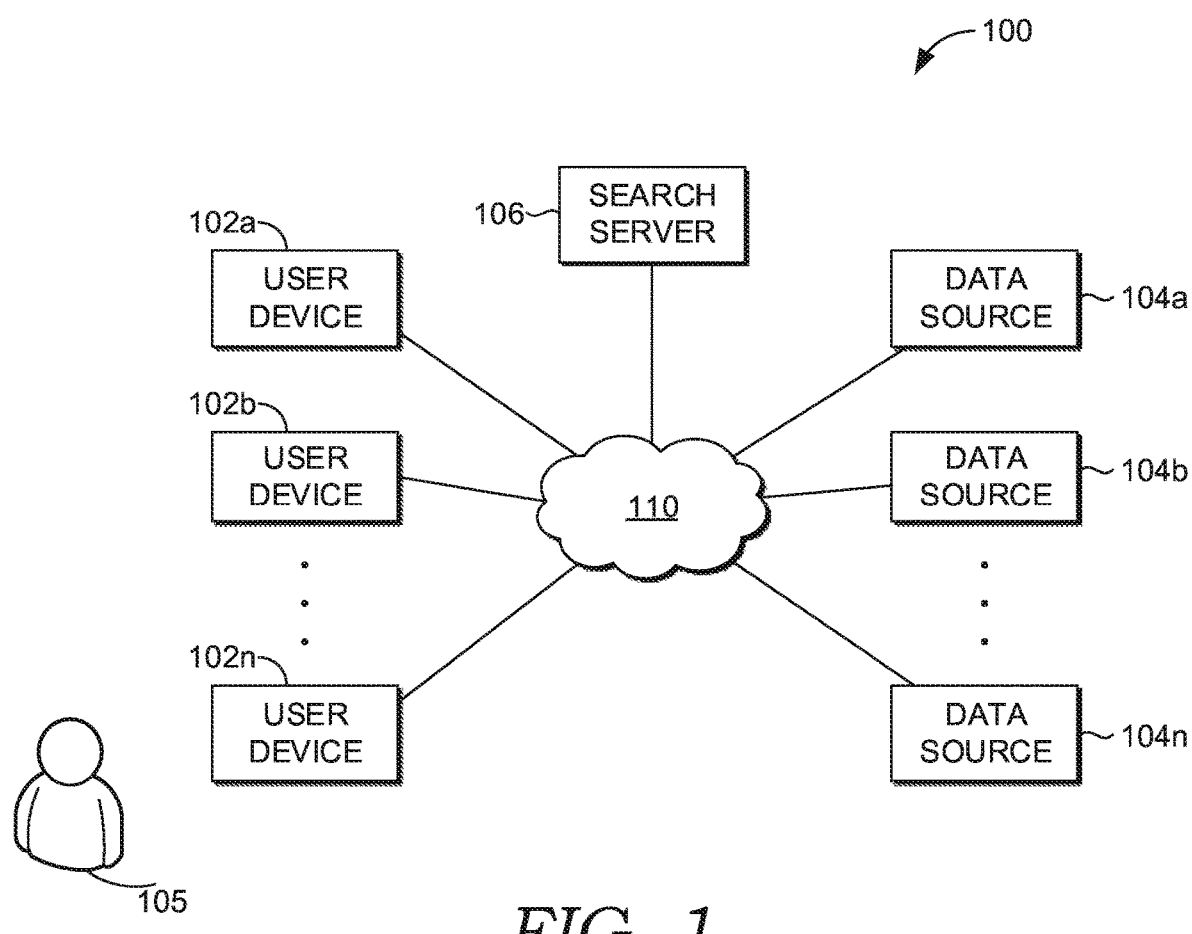
FIG. 1 is a block diagram of an example operating environment suitable for implementing aspects of the technology.

The subject matter of aspects of the technology is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Aspects of the technology described herein make improved use of limited screen space on a search results page by determining whether to present a question-and-answer experience and/or an entity details experience. This determination affects the amount of information presented and the format in which it is presented. In general, the question-and-answer experience provides less information and is more targeted to a question and/or query terms other than the entity. In contrast, the entity details experience provides more information about the entity that is not tailored to the query beyond the entity being included in the query. The search results page may be a webpage displayed through a browser. The search results page may also be a page displayed through an application, such as a personal assistant application, navigation application, shopping application, and the like.

A question-and-answer experience attempts to provide a concise answer to a question posed in the query about an entity. The information in the answer may be sourced from many different locations, such as knowledge bases, dictionaries, and webpages. The content provided about the entity in the answer is specific to the query, rather than general. The answer content is selected for relevance to terms, other than the entity, in the query.

An entity details experience is generated from a knowledge base and presents multiple attribute values for the entity. The attributes are standard for entities of a type, such as city, location, or person. The attribute value is presented and associated with an attribute label, such as birthdate. For example, the attributes shown for two actors will likely be similar, but, of course, with different attribute values. Attributes can differ for entities of the same type when attribute value data is not available in the knowledge base for one of the entities. The attributes shown will be the same for any query that includes the entity.

In one aspect, the determination of whether to show a question-and-answer experience and/or an entity details experience is based, at least in part, on an entity-details intent classification score ("intent classification score") generated by a machine classification system, such as a neural network or support vector machine (SVP). The machine classification system is trained using queries labeled as having an entity-details intent or not having an entity-details intent. Once trained, the machine classification system can assign an intent classification score to an unlabeled query. The intent classification score can be a confidence score indicating a degree of confidence the machine classification system assigns to the query that an entity-details experience should be shown in response to the query. Conceptually, a high score means that the new query has a high level of similarity to training data labeled with an entity-details intent. A low score means the opposite.

Generating training data for the machine classification system can be an expensive undertaking. In one aspect, the training data is obtained by having a person review and label a query. The number of training data queries needed to sufficiently train the machine classification system can be reduced if the training data comprises an optimal number of edge cases. Edge cases are those in the border area between having an entity-details intent and not having the intent. In other words, the edge cases are more ambiguous than queries with a clear-cut entity-details intent.

The technology described herein efficiently generates training data comprising edge cases by first training a mini-classifier on a comparatively small set of data. Because of the small set of data, the mini-classifier will not have the desired accuracy of a production classifier. However, the mini classifier can process a large number of queries, optionally taken from a query log of actual queries, and assign an intent score. The queries assigned an intent score within an edge zone, such as between 0.45 and 0.55 (on a 0 to 1 scale), can then be used as input to the labeling process. A person would then assign a label for each of these "edge" queries during the labeling process. The training data can also include strong positives and strong negatives. The output from the mini-classifier can also be used to identify strong negatives and strong positives. The end result is an efficient mixture of presumptively strong positives, strong negatives, and edge case queries that can be used to generate training data. Using this mixture as a feed to the labeling process can reduce the number of queries that need to be labeled to train a precise and robust machine classifier.

The machine classifier can take the entire query as input, but can also take other data derived from the query as additional or alternative input. For example, the parts of speech of each word in the query can be provided as input. In another aspect, the total number of words in a query can be provided as input. Question terms in the query, such as who, what, when, where, why, and how, can be specifically identified. An entity in the query can be assigned a broad role, such as a person, place, thing, concept, and the like. When available, a specific role for the entity in the query can be identified, such as actor, singer, politician, and the like. Other preprocessing could be performed on the query and provided as input to the machine classifier. The preprocessing can be used both during training and production of the classifier.

Switching from how the intent score is generated to how it is used, the intent score may be used in combination with various rules to determine whether an available question-and-answer experience is presented to the user. In one aspect, two different intent-score based rules are used to determine whether an entity-details intent exists. If either of the two intent-score based rules determines that entity-details intent exists, then an available Q&A experience is not presented and only the entity-details experience is presented. As described subsequently, other rules that do not rely on the intent score may be used to determine that entity-details intent exists.

The first intent-score based rule takes the intent score from the classifier, usage information about the intent experience that could be shown in response to the query, and information about the Q&A experience that could be shown in response to the query as input. The information about the Q&A experience is a type classification. Q&A experiences can be classified as many different types. Two types of particular interest are health information and lists. A health type of Q&A experience provides information related to a medical condition. For example, symptoms of scarlet fever may be presented in a Q&A experience in response to a query "scarlet fever." A list of top grossing movies may be presented as a Q&A experience in response to a query "top 10 movies of 2018." Other types of Q & A experiences include technical information, financial information, date and time information, and weather. An exemplary date and time query could be, "when is Labor Day?"

In one aspect, the first intent-score based rule requires three different criteria to be met in order to find that an entity-details intent exists. First, the intent score from the classifier needs to be above a high threshold score. This score is described as "high" in relation to the lower threshold used in the second rule. Second, the search engine usage data must show that the entity experience has been presented previously in response to a similar query. Third, the Q&A experience type must not be on a white list. The white list includes Q&A experience types that should always be shown, which means that an entity-details intent should not be found. The white list can include at least the health type, time/date, and list type of experiences. If all three criteria are satisfied, then an entity-details intent is found.

The second intent-score-based rule uses the same input as the first, however, instead of the Q&A experience type, the rule uses the Q&A experience source. In one aspect, the second intent-score based rule requires three different criteria to be met in order to find that an entity-details intent exists. First, the intent score from the classifier needs to be above a medium threshold score. This score is described as "medium" in relation to the higher threshold used in the first rule. The medium threshold may be set to be above a range that defines an ambiguous intent. For example, 0.6 (on a 0 to 1 scale) could be the medium threshold. In other words, the classifier shows an entity-details intent, but the signal does not need to be strong. Second, the search engine usage data must show that the entity experience has been presented previously in response to a similar query. Third, the source of the Q&A experience must not be classified as a curated reference source, such as Wikipedia or IMDB. The technology described herein can use a list of curated reference sources and use a lookup function to determine if this third aspect of the rule is satisfied. In another aspect, if the entity-experience and the Q&A experience are from the same source, then the source of the Q&A experience is classified as a curated reference source. If all three criteria are satisfied, then an entity-details intent is found.

In addition to the intent-score-based rules described previously, content-based rules may be used to determine that an entity-details intent exists. In one aspect, two different content-based rules are used to determine whether an entity-details intent exists. If either of the two content-based rules determines that entity-details intent exists, then an available Q&A experience is not presented and only the entity-details experience is presented. Optionally, the intent score could be used with either content-based rule in the form of a low-threshold. The content-based rules form a strong presumption that the entity-details intent is present, thus, a lower threshold (than the previously described high and medium thresholds) could be used.

The first content-based rule determines whether a title of the entity experience matches the query. If the title matches the query, then an entity-details intent is found. The match may be exact, n-gram based, and/or account for misspellings using a minimal edit distance.

The second content-based rule generates a similarity score that quantifies the similarity between the content of entity experience and the content of Q&A experience. If the similarity score is above a threshold, then an entity-details intent is found. The entity experience often includes more features, thus, the similarity score could be based on an amount of content within the Q&A experience that is also in the entity experience. In other words, the similar score may be generated in a way that does not penalize the entity experience for having additional content.

Thus, aspects of the technology may use four different rules to find an entity-details intent. If any one or more of the rules is satisfied, then the intent is found. The rules may be evaluated in series or in parallel. If in series, then subsequent rules in the series need not be evaluated when a precedent rule finds an entity-details intent. If in parallel, then processing of other rules may stop when a rule finds an entity-details intent.

In addition to the rules mentioned, the technology can use a hotfix. The hotfix creates a list of queries that always result in a particular experience, such as showing the Q&A experience. The hotfix servers is a work-around for popular queries that, for whatever reason, produce an undesirable result. The hotfix list could be evaluated as a first step as a gatekeeper to the four previously described rules.

Having briefly described an overview of aspects of the technology described herein, an exemplary operating environment in which aspects of the technology described herein may be implemented is described below.

Turning now to FIG. 1, a block diagram is provided showing an operating environment 100 in which aspects of the present disclosure may be employed. It should be understood that this and other arrangements described herein are set forth only as examples. Other arrangements and elements (e.g., machines, interfaces, functions, orders, and groupings of functions) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes a number of user devices, such as user devices 102*a* and 102*b* through 102*n*; a number of data sources, such as data sources 104*a* and 104*b* through 104*n*; search server 106; and network 110. It should be understood that environment 100 shown in FIG. 1 is an example of one suitable operating environment. Each of the components shown in FIG. 1 may be implemented via any type of computing device, such as computing device 800, described in connection to FIG. 8, for example. These components may communicate with each other via network 110, which may include, without limitation, one or more local area networks (LANs) and/or wide area networks (WANs). In exemplary implementations, network 110 comprises the Internet and/or a cellular network, amongst any of a variety of possible public and/or private networks.

It should be understood that any number of user devices, servers, and data sources may be employed within operating environment 100 within the scope of the present disclosure. Each may comprise a single device or multiple devices cooperating in a distributed environment. For instance, search server 106 may be provided via multiple devices arranged in a distributed environment that collectively provide the functionality described herein. Additionally, other components not shown may also be included within the distributed environment.

User devices 102*a* and 102*b* through 102*n* can be client devices on the client-side of operating environment 100, while search server 106 can be on the server-side of operating environment 100. Server 106 can comprise server-side software designed to work in conjunction with client-side software on user devices 102*a* and 102*b* through 102*n* so as to implement any combination of the features and functionalities discussed in the present disclosure. This division of operating environment 100 is provided to illustrate one example of a suitable environment, and there is no requirement for each implementation that any combination of search server 106 and user devices 102*a* and 102*b* through 102*n* remain as separate entities.

User devices 102a and 102b through 102n may comprise any type of computing device capable of use by a user. For example, in one aspect, user devices 102a through 102n may be the type of computing device described in relation to FIG. 8 herein. By way of example and not limitation, a user device may be embodied as a personal computer (PC), a laptop computer, a mobile or mobile device, a smartphone, a tablet computer, a smart watch, a wearable computer, a personal digital assistant (PDA), an MP3 player, global positioning system (GPS) or device, video player, handheld communications device, gaming device or system, entertainment system, vehicle computer system, embedded system controller, remote control, appliance, consumer electronic device, a workstation, or any combination of these delineated devices, or any other suitable device where notifications can be presented. A user 105 may be associated with one or more user devices. The user 105 may communicate with search server 106, data source 104a and 104b through 104n, through the user devices.

Data sources 104a and 104b through 104n may comprise data sources and/or data systems, which are configured to make data available to any of the various constituents of operating environment 100, or system 200 described in connection to FIG. 2. (For example, in one aspect, one or more data sources 104a through 104n provide (or make available for accessing) data for generating an entity-details experience or Q&A experience.) Data sources 104a and 104b through 104n may be discrete search server 106 or may be incorporated and/or integrated into at least one of those components. The data sources 104a through 104n can include web servers that host web pages that can include content responsive to queries. The data sources 104a through 104n can include one or more knowledge bases.

Figure 2:
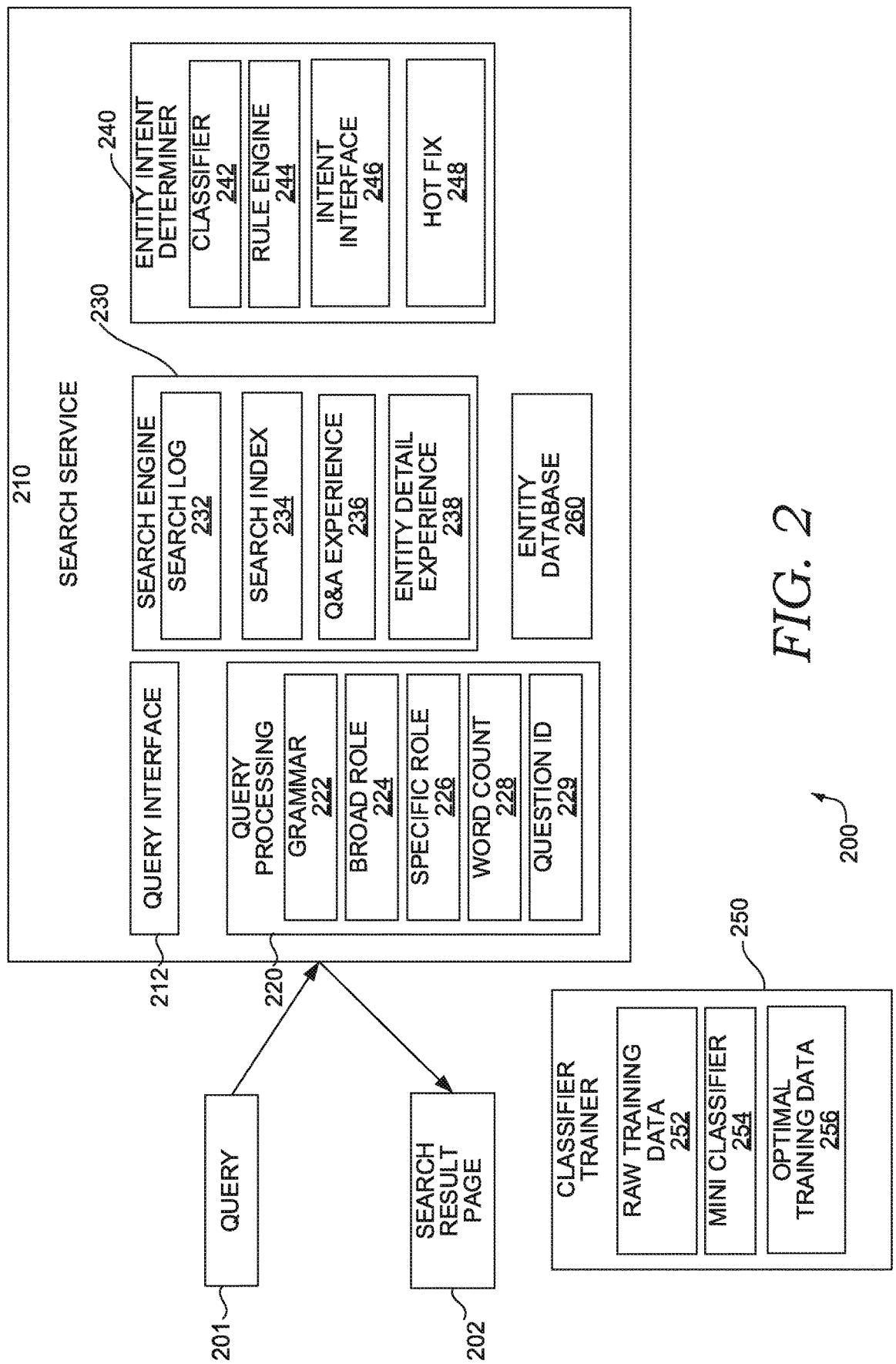
FIG. 2 is a diagram showing a format selection environment, according to an aspect of the technology described herein.

Operating environment 100 can be utilized to implement one or more of the components of system 200, described in FIG. 2, including components for receiving search queries, determining a query intent, and providing relevant content in a Q&A experience and/or entity-details experience.

Referring now to FIG. 2, with FIG. 1, a block diagram is provided showing aspects of an example computing system architecture suitable for implementing an aspect of the technology and designated generally as system 200. System 200 represents only one example of a suitable computing system architecture. Other arrangements and elements can be used in addition to or instead of those shown, and some elements may be omitted altogether for the sake of clarity. Further, as with operating environment 100, many of the elements described herein are functional entities that may be implemented as discrete or distributed components or in conjunction with other components, and in any suitable combination and location.

At a high level, system 200 comprises a search service 210 that receives a search query 201 and returns a search result page 202 that includes a user experience optimized to present relevant content. These user experiences include an entity details experience and a Q&A experience. The entity-details intent determiner 240 can determine whether an entity-details intent exists for the query and provide output instructions based on the determination. The search service 210 may be embodied on one or more servers, such as search server 106.

Example system 200 includes the search service 210 (including its components 212, 220, 230, and 240) and classifier trainer 250 (including its components 252, 254, and 256). The search service 210 (and its components) and classifier trainer 250 (and its components) may be embodied as a set of compiled computer instructions or functions, program modules, computer software services, or an arrangement of processes carried out on one or more computer systems, such as computing device 800 described in connection to FIG. 8, for example.

In one aspect, the functions performed by components of system 200 are associated with one or more personal assistant applications, services, or routines. In particular, such applications, services, or routines may operate on one or more user devices (such as user device 102a), servers (such as search server 106), may be distributed across one or more user devices and servers, or be implemented in the cloud. Moreover, in some aspects, these components of system 200 may be distributed across a network, including one or more servers (such as server 106) and client devices (such as user device 102a), in the cloud, or may reside on a user device such as user device 102a. Moreover, these components, functions performed by these components, or services carried out by these components may be implemented at appropriate abstraction layer(s) such as the operating system layer, application layer, hardware layer, etc., of the computing system(s). Alternatively, or in addition, the functionality of these components and/or the aspects of the technology described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in example system 200, it is contemplated that in some aspects, functionality of these components can be shared or distributed across other components.

The search service 210 includes a query interface 212, a query processing component 220, a search engine 230, and an entity-details intent determiner 240. The query processing component 220 includes a grammar identification component 222, a broad role identification component 224, a specific role identification component 226, a word count component 228, and a question identification component 229. The search engine 230 includes a search log 232, a search index 234, a question-and-answer experience component 236, and an entity details experience component 238. The entity-details intent determiner 240 includes a classifier 242, a rule engine 244, an intent interface 246, and a hotfix component 248.

The search service 210 receives a search query 201 and returns a search results page 202 that includes a user experience optimized to present relevant content. The search results page may be a webpage displayed through a browser. The search results page may also be a page displayed through an application, such as a personal assistant application, navigation application, shopping application, and the like.

The query interface 212 receives a query and communicates it to other components, such as the query processing component 220, the search engine 230, and the entity-details intent determiner 240. The query interface 212 may generate a graphical user interface through which the query is input, such as a search box on a web page. The query interface 212 may also comprise an Application Program Interface (API) that lets applications submit the query (and optionally other information, such as user information, contextual information, and the like) to the search service 210. The query interface can also output search results, such as the search results page 202.

The query processing component 220 identifies features of the query that can be provided to the classifier 242. The classifier 242 uses the features as an input to generate an entity-details intent score.

The query processing component 220 includes a grammar identification component 222 that identifies the part of speech for each term in the query. The output can be a sequence of speech parts or the terms in the query mapped to the speech parts. Other output forms are possible.

The broad role identification component 224 may identify the entity and identify a broad role for each term that identifies an entity. For example, the entity Tiger Woods could be identified as a person. In one aspect, the broad role identification component 224 outputs a query overlay with the entity terms replaced by the broad role. Thus, "how many golf tournaments has Tiger Woods won" becomes "how many golf tournaments has [person] [person] won?" Other forms of output are possible.

The specific role identification component 226 is similar to the broad role identification, but provides more granular information when possible. For example, Tiger Woods could be a professional athlete or, more specifically, "a PGA golfer."

A word count component 228 counts the words in the query. In one aspect, the word count component 228 counts spaces in the query to determine the words. This means that the words do not need to be actual words, but could be a group of characters.

A question identification component 229 identifies terms that indicate a question, such as who, what, when, where, why, which, how, and the like. This list is not comprehensive. A semantic analysis may be performed to determine whether words, like "which," indicate a question or not.

The search engine 230 identifies content that is responsive to the query and typically provides the most relevant results. The results can include Q&A experiences and entity-detail experiences.

A search log 232 stores the queries entered by users, results returned, and click-through for the URIs included in the results. The queries stored in the search logs 232 may include entity queries. In some embodiments, the search logs 232 stores a timestamp for each query. The timestamp represents the day, hour, minute, second, etc., that the query is received. The search logs 232 store the number of queries received by the search engine; number of clicks, hovers, etc., received from a client device for each URI returned in response to the query; and at least one identifier for each of the URIs interacted with by the user of a client device. The search log 232 can identify Q&A experiences and entity-detail experiences shown in response to a query. The user interaction with these experiences can also be recorded.

The search index 234 includes information about documents (e.g., web pages) that may be returned in a search result. The index 234 can take the form of an inverted index, but other forms are possible. The index 234 allows the search engine to identify documents that are responsive to the query. The index 234 can include keywords and other information that describes a document for the purpose of determining its relevance.

Figure 3:
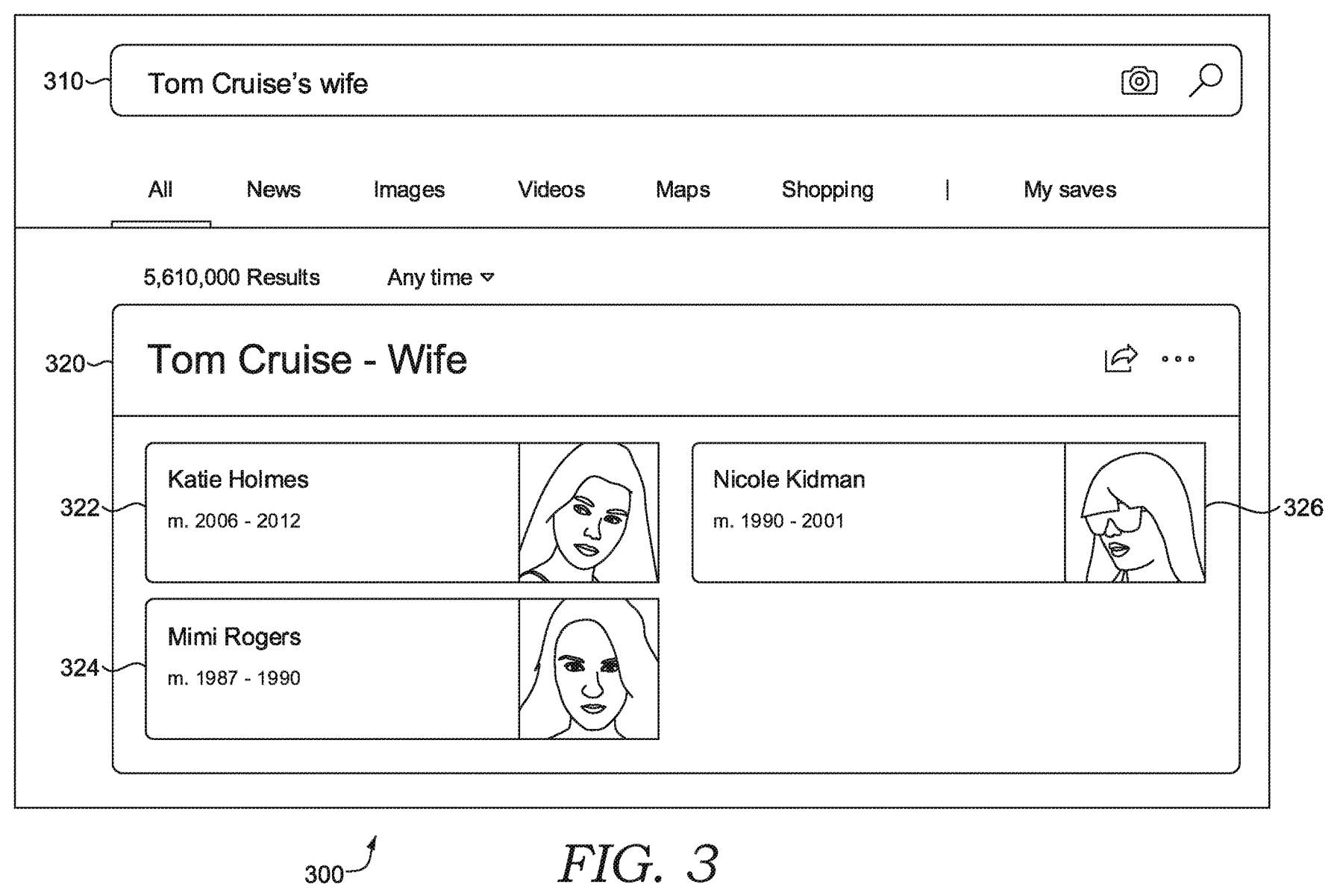

The question-and-answer experience component 236 generates a question-and-answer experience, such as experience 300 shown in FIG. 3.

Figure 4:
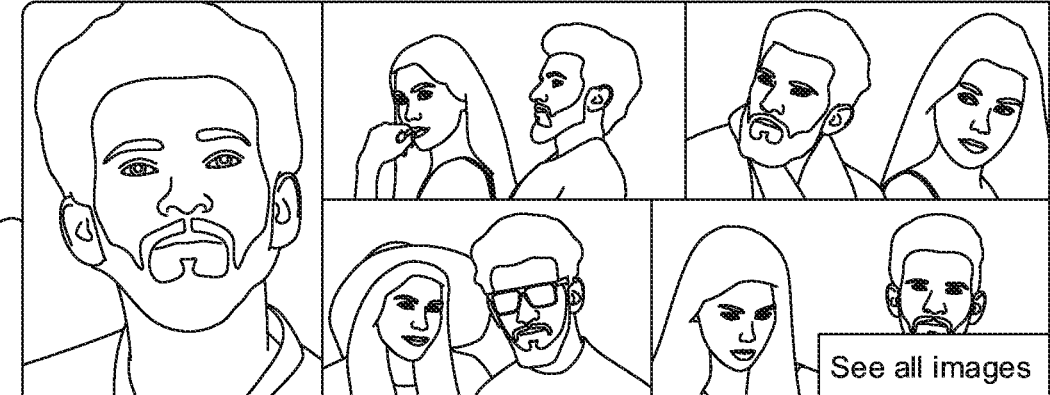
FIG. 4 is a diagram showing an entity detail experience, according to an aspect of the technology described herein.

The entity details experience component 238, generates entity-detail experiences, such as experience 400 shown in FIG. 4.

The entity-details intent determiner 240 determines whether an entity experience, Q&A experience, or possibly both is the most relevant response to the query. The entity-details intent determiner 240 provides instructions to the query interface 212, or some other component, to present the optimal experience.

The classifier 242 generates an entity-details intent score. The score is a measure of how closely the query matches a criteria for showing the entity-details experience. In one aspect, the entity-details experience should be shown when two criteria are met. First, the query mentions at least one entity literally. Second, the query is looking for the definition, description, or general information of an entity, which is literally mentioned in the query. An entity can be a real-world object, including person, location, organization, local, store/services/chain, movie, book, TV show, song, album, car model, product, etc., or a concept including free will, attribution theory, scientific terms, medical, terminology, etc. For example, this query is an entity intent query: {Incredibles 2}. And the following query is not, "Yuval Noah Harari book 2018." The query is asking about the book, when correctly understood, but the book entity "21 lessons for the 21st century" is not mentioned in the query, so it is not an entity-details intent query.

A classifier is used to determine how closely a query matches this criteria. The classifier includes a machine classification system, such as a neural network or support vector machine (SVP). The machine classification system is trained using queries labeled as having an entity-details intent or not having an entity-details intent. Once trained, the machine classification system can assign an intent classification score to an unlabeled query. The intent classification score can be a confidence score indicating a degree of confidence the machine classification system assigns to the query that an entity-details experience should be shown in response to the query. Conceptually, a high score means that the new query has a high level of similarity to training data labeled with an entity-details intent. A low score means the opposite.

The classifier 244 can take the query as input along with the query processing 220 outputs, such as role identifications and word counts.

The rule engine 244 evaluates various rules to determine whether an entity-details intent exists. In one aspect, two different intent-score-based rules are used to determine whether an entity-details intent exists. If either of the two intent-score-based rules determines that entity-details intent exists, then an available Q&A experience is not presented and only the entity-details experience is presented. As described subsequently, other rules that do not rely on the intent score may be used to determine that entity-details intent exists.

The first intent-score based rule takes the intent score from the classifier, usage information about the intent experience that could be shown in response to the query, and information about the Q&A experience that could be shown in response to the query as input. The information about the Q&A experience is a type classification. Q&A experiences can be classified as many different types. Two types of particular interest are health information and lists. A health type of Q&A experience provides information related to a medical condition. For example, symptoms of scarlet fever may be presented in a Q&A experience in response to a query "scarlet fever." A list of top grossing movies may be presented as a Q&A experience in response to a query "top 10 movies of 2018." Other types of Q & A experiences include technical information, financial information, date and time information, and weather. An exemplary date and time query could be, "when is Labor Day?"

In one aspect, the first intent-score based rule requires three different criteria to be met in order to find that an entity-details intent exists. First, the intent score from the classifier needs to be above a high threshold score. This score is described as "high" in relation to the lower threshold used in the second rule. Second, the search engine usage data must show that the entity experience has been presented previously in response to a similar query. Third, the Q&A experience type must not be on a white list. The white list includes Q&A experience types that should always be shown, which means that an entity-details intent should not be found. The white list can include at least the health type, time/date, and list type of experiences. If all three criteria are satisfied, then an entity-details intent is found.

The second intent-score-based-rule uses the same input as the first, however, instead of the Q&A experience type, the rule uses the Q&A experience source. In one aspect, the second intent-score based rule requires three different criteria to be met in order to find that an entity-details intent exists. First, the intent score from the classifier needs to be above a medium threshold score. This score is described as "medium" in relation to the higher threshold used in the first rule. The medium threshold may be set to be above a range that defines an ambiguous intent. For example, 0.6 (on a 0 to 1 scale) could be the medium threshold. In other words, the classifier shows an entity-details intent, but the signal does not need to be strong. Second, the search engine usage data must show that the entity experience has been presented previously in response to a similar query. Third, the source of the Q&A experience must not be classified as a curated reference source, such as Wikipedia or IMDB. The technology described herein can use a list of curated reference sources and use a lookup function to determine if this third aspect of the rule is satisfied. In another aspect, if the entity-experience and the Q&A experience are from the same source, then the source of the Q&A experience is classified as a curated reference source. If all three criteria are satisfied, then an entity-details intent is found.

In addition to the intent-score-based rules described previously, content-based rules may be used to determine that an entity-details intent exists. In one aspect, two different content-based rules are used to determine whether an entity-details intent exists. If either of the two content-based rules determines that entity-details intent exists, then an available Q&A experience is not presented and only the entity-details experience is presented. Optionally, the intent score could be used with either content-based rule in the form of a low-threshold. The content-based rules form a strong presumption that the entity-details intent is present, thus, a lower threshold (than the previously described high and medium thresholds) could be used.

The first content-based rule determines whether a title of the entity experience matches the query. If the title matches the query, then an entity-details intent is found. The match may be exact, n-gram based, and/or account for misspellings using a minimal edit distance.

The second content-based rule generates a similarity score that quantifies the similarity between the content of entity experience and the content of Q&A experience. If the similarity score is above a threshold, then an entity-details intent is found. The entity experience often includes more features, thus, the similarity score could be based on an amount of content within the Q&A experience that is also in the entity experience. In other words, the similarity score may be generated in a way that does not penalize the entity experience for having additional content.

Thus, aspects of the technology may use four different rules to find an entity-details intent. If any one or more of the rules is satisfied, then the intent is found. The rules may be evaluated in series or in parallel. If in series, then subsequent rules in the series need not be evaluated when a precedent rule finds an entity-details intent. If in parallel, then processing of other rules may stop when a rule finds an entity-details intent.

The intent interface 246 communicates the determined intent to consumers of this determination, such as the search engine 230 and the query interface 212. The search engine 230 may use this information to instruct the Q&A experience component 236 and the entity details experience component 238.

The hotfix component 248 acts as an override to other system components. Specific queries may be added to a hotfix list and liked to a desired output, such as showing a Q&A experience, showing an entity details experience, or showing both. When a received query matches a query on the hotfix list, then the linked output is executed without further analysis or regardless of the determination made by the rule engine 244.

The classifier trainer 250 trains the classifier 244. Generating training data for the machine classification system can be an expensive undertaking. In one aspect, the training data is obtained by having a person review and label a query. The number of training data queries needed to sufficiently train the machine classification system can be reduced if the training data comprises an optimal number of edge cases. Edge cases are those in the border area between having an entity-details intent and not having the intent. In other words, the edge cases are more ambiguous than queries with a clear-cut entity-details intent.

The technology described herein efficiently generates training data comprising edge cases by first training a mini-classifier 254 on a comparatively small subset of the raw training data sets 252. Because of the small set of data, the mini-classifier 254 will not have the desired accuracy of a production classifier 244. However, the mini-classifier 254 can process a large number of queries, optionally taken from a query log of actual queries, and assign an intent score. The queries assigned an intent score within an edge zone, such as between 0.45 and 0.55 (on a 0 to 1 scale), can then be used as input to the labeling process. A person would then assign a label for each of these "edge" queries during the labeling process. The training data can also include strong positives and strong negatives. The output from the mini-classifier 254 can also be used to identify strong negatives and strong positives. The end result is an efficient mixture of presumptively strong positives, strong negatives, and edge case queries that can be used to generate optimal training data 256. Using this mixture as a feed to the labeling process can reduce the number of queries that need to be labeled to train a precise and robust machine classifier.

Different machine learning technologies are trained differently. The following example is for a neural network, but aspects of the technology are not limited to use with a neural network. As used herein, a neural network comprises at least three operational layers. The three layers can include an input layer, a hidden layer, and an output layer. Each layer comprises neurons. The input layer neurons receive the labeled query (and associated preprocessing data) and pass data derived from the query to neurons in the hidden layer. Neurons in the hidden layer pass data to neurons in the output layer. The output layer then produces an entity-details intent score. Different types of layers and networks connect neurons in different ways.

Neurons have weights, an activation function that defines the output of the neuron given an input (including the weights), and an output. The weights are the adjustable parameters that cause a network to produce a correct output. For example, if the training query is labeled no entity-detail intent, then the correct output is to classify the query as having not entity-details intent. The weights are adjusted during training. Once trained, the weight associated with a given neuron can remain fixed. The other data passing between neurons can change in response to a given input (e.g., image). Retraining the network with additional training queries can update one or more weights in one or more neurons.

The neural network may include many more than three layers. Neural networks with more than one hidden layer may be called deep neural networks. Example neural networks that may be used with aspects of the technology described herein include, but are not limited to, multilayer perceptron (MLP) networks, convolutional neural networks (CNN), recursive neural networks, recurrent neural networks, and long short-term memory (LSTM) (which is a type of recursive neural network).

In each type of deep model, training is used to fit the model output to the training data. In particular, weights associated with each neuron in the model can be updated through training. Originally, the model can comprise random weight values that are adjusted during training. In one aspect, the model is trained using backpropagation. The backpropagation process comprises a forward pass, a loss function, a backward pass, and a weight update. This process is repeated for each training query. The goal is to update the weights of each neuron (or other model component) to cause the model to produce an output that maps to the correct label. Each labeled query is input to the model and used to train it. Once a sufficient number of training queries (and associated pre-processing data) are fed to the model, then the training can stop. The classifier 244 can then be used to generate text strings from unlabeled images of rendered domain names.

The entity database 260 stores information on entities. The database may store attributes about the entity. The attribute may indicate whether the entity is person, place, document, movie, song, etc. Additional attributes may include a brief description of the entity. The entity database 260 may be provided by a third party. Entities may be identified from news stories or social media blogs. In one embodiment, the entity database 260 may be provided by a social media provider or a contact aggregator. In other embodiments, the entity database 260 also stores the entities and the URIs that are mapped to the entities. The URIs in the entity database 260 are extracted from search results that are interacted with in response to a query specifying a corresponding entity. The interactions may include clicks, hovers, gestures, voice commands, etc., received from a client device employed by a user. The query is processed by the search engine to return the search results.

FIGS. 3 and 4 illustrate a different information provided in a question-and-answer experience interface and an entity-details experience respectively. Both are generated in response to the same query, "Tom Cruise's wife." As can be seen, each interface has pros and cons and may be optimized for different kinds of queries.

Turning now to FIG. 3, a question-and-answer experience interface 300 is shown. The interface 300 includes a search box 310 in which the query, "Tom Cruise's wife" is written. The American actor Tom Cruise is the only entity listed in this query and wife is the only other term in the query. The interface heading 320 states Tom Cruise—Wife. The question-and-answer experience attempts to answer the question, "who is Tom Cruise's wife?" As can be seen, the only information provided about entity Tom Cruise pertains to the three women he has been married to previously. The first answer section 322 shows a picture of Katie Holmes with an indication she was married to Tom Cruise between 2006 and 2012. The second answer section 324 shows a picture of Mimi Rogers and provides an indication she was married to Tom Cruise from 1987 to 1990. The third answer section 326 shows a picture of Nicole Kidman and indicates she was married to Tom Cruise from 1990 to 2001. The user who is only curious about Tom Cruise's wives would likely find the question-and-answer experience 300 optimal. The answer is provided without additional information.

Turning now to FIG. 4, an entity-detail experience interface 400 is shown. The interface 400 provides a broad range of information about Tom Cruise. The interface 400 is also generated in response to the query "Tom Cruise—Wife." The interface 400 includes an image section 410 with several images of Tom Cruise. The interface 400 includes an experience title 422, a detailed role 424, a blurb 426, a list of spouses 428, birth information 430, height 432, network 434, partner 436, and a list of upcoming movies 438. Each of these sections includes a label and corresponding attribute information. Taking the birth information 430 as an example, the label "born" is coupled with Jul. 3, 1962 (age 57). As can be seen, the entity-detail experience interface 400 includes information about Tom Cruise's wives along with other general information that is not necessarily responsive to the query. Some users may find the question-and-answer experience 300 more responsive to a query asking about Tom Cruise's wives. However, entity-details experience 400 may be more responsive to a broad query such as simply, "Tom Cruise."

Figure 5:
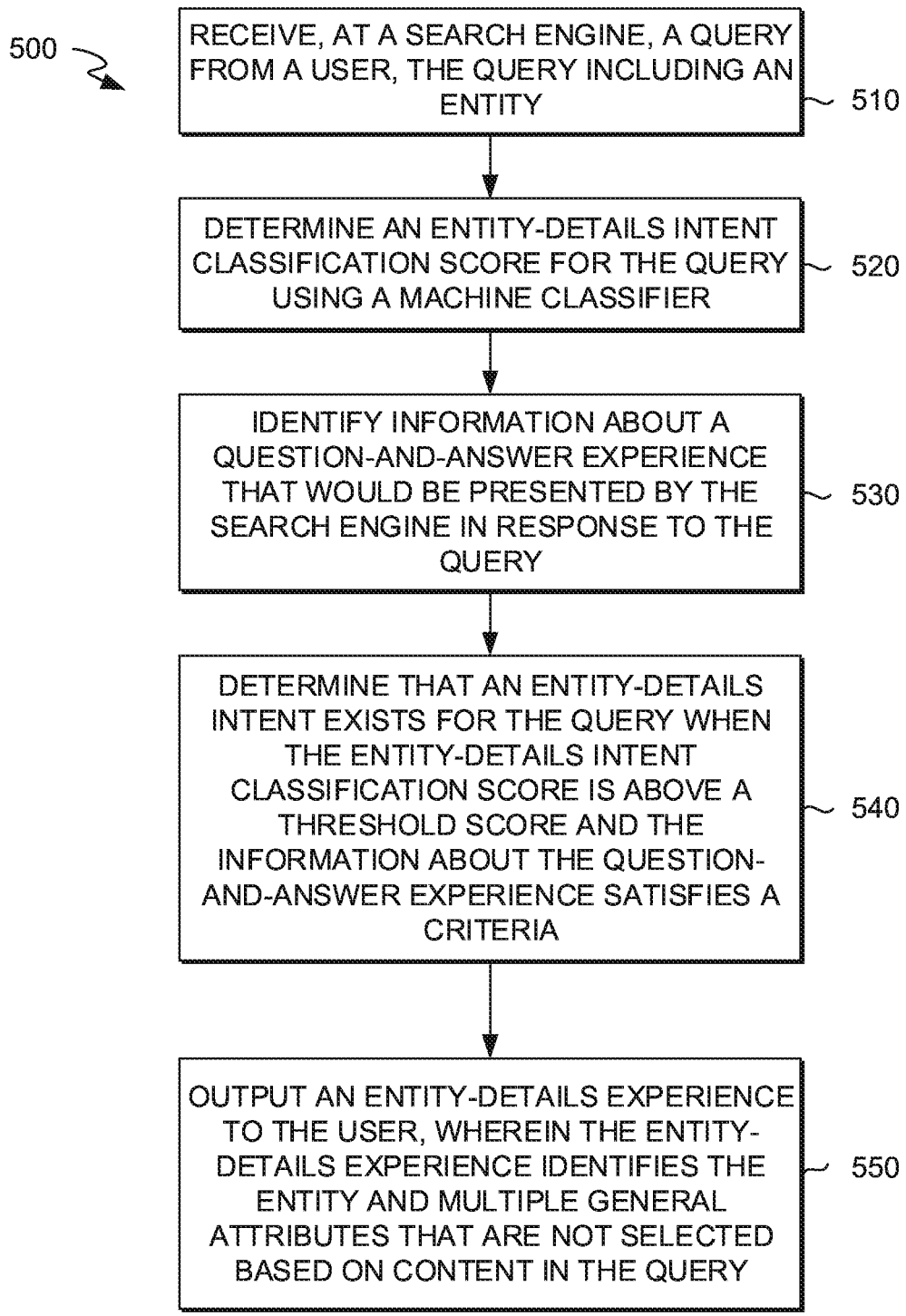
FIGS. 5-7 depict flow diagrams of methods for providing relevant search result content in an experience format that is optimized to the query, in accordance with an aspect of the technology.

FIG. 5 is a flow chart showing a method 500 for providing relevant search result content in an experience format that is optimized to a query, in accordance with an aspect of the technology described herein.

At step 510, a query from a user is received from a user at a search engine. The query includes an entity. For example, the query could be, "what are the names of Hamilton cast members?" In this example, the musical Hamilton is the entity. In one aspect, an entity is only considered to be "in the query" if it is explicitly recited, as with Hamilton above. In contrast, "names" refers to cast members, who are entities, but the cast members are not considered entities for the purpose of this technology because they are not listed by their individual names. Broadly, an entity can be a noun. An entity can be a person, place, thing, philosophy, feeling, health condition, mental state, or the like. Practically, the technology may only identify entities listed in a knowledge base or some other source. Thus, a query including the name of a person who is not well-known may not be identified as an entity.

At step 520, an entity-details intent classification score is determined for the query using a machine classifier. The machine classification system can be a neural network, support vector machine (SVP), or use some other technology. Essentially, the score is a measure of how closely the query matches training queries labeled as having an entity-details intent. The machine classification system is trained using queries labeled as having an entity-details intent or not having an entity-details intent. Once trained, the machine classification system can assign an intent classification score to an unlabeled query. The intent classification score can be a confidence score indicating a degree of confidence the machine classification system assigns to the query that an entity-details experience should be shown in response to the query. Conceptually, a high score means that the new query has a high level of similarity to training data labeled with an entity-details intent. A low score means the opposite.

At step 530, information about a question-and-answer experience that would be presented by the search engine in response to the query is identified. The information can include a source from which the question-and-answer experience is generated, a classification for the source, and other information. The information can also include a category or type of question-and-answer experience generated. The type can be form-based, for example, lists, or content category-based, such as healthcare related.

At step 540, an entity-details intent is determined to exist for the query because the entity-details intent classification score is above a threshold score and the information about the question-and-answer experience satisfies a criteria. The criteria may be that the Q&A experience type must not be on a white list. The white list includes Q&A experience types that should always be shown, which means that an entity-details intent should not be found. The white list can include at least the health type, date/time type, and list type of experiences. If all three criteria are satisfied, then an entity-details intent is found. An additional criteria might be that the search log shows that an entity-details experience has been presented previously in response to the same query or a similar query.

In another aspects, the criteria is that the source of the Q&A experience must not be classified as a curated reference source, such as Wikipedia or IMDB. The technology described herein can use a list of curated reference sources and use a lookup function to determine if this third aspect of the rule is satisfied. In another aspect, if the entity-experience and the Q&A experience are from the same source, then the source of the Q&A experience is classified as a curated reference source. An additional criteria might be that the search log shows that an entity-details experience has been presented previously in response to the same query or a similar query.

The two criteria described previously could be combined with different threshold scores. In one aspect, the first criteria uses a higher threshold score than the second.

At step 550, an entity-details experience is output to the user. The entity-details experience identifies the entity and multiple general attributes that are not selected based on content in the query. An exemplary entity-details experience has been described previously with reference to FIG. 4.

Figure 6:
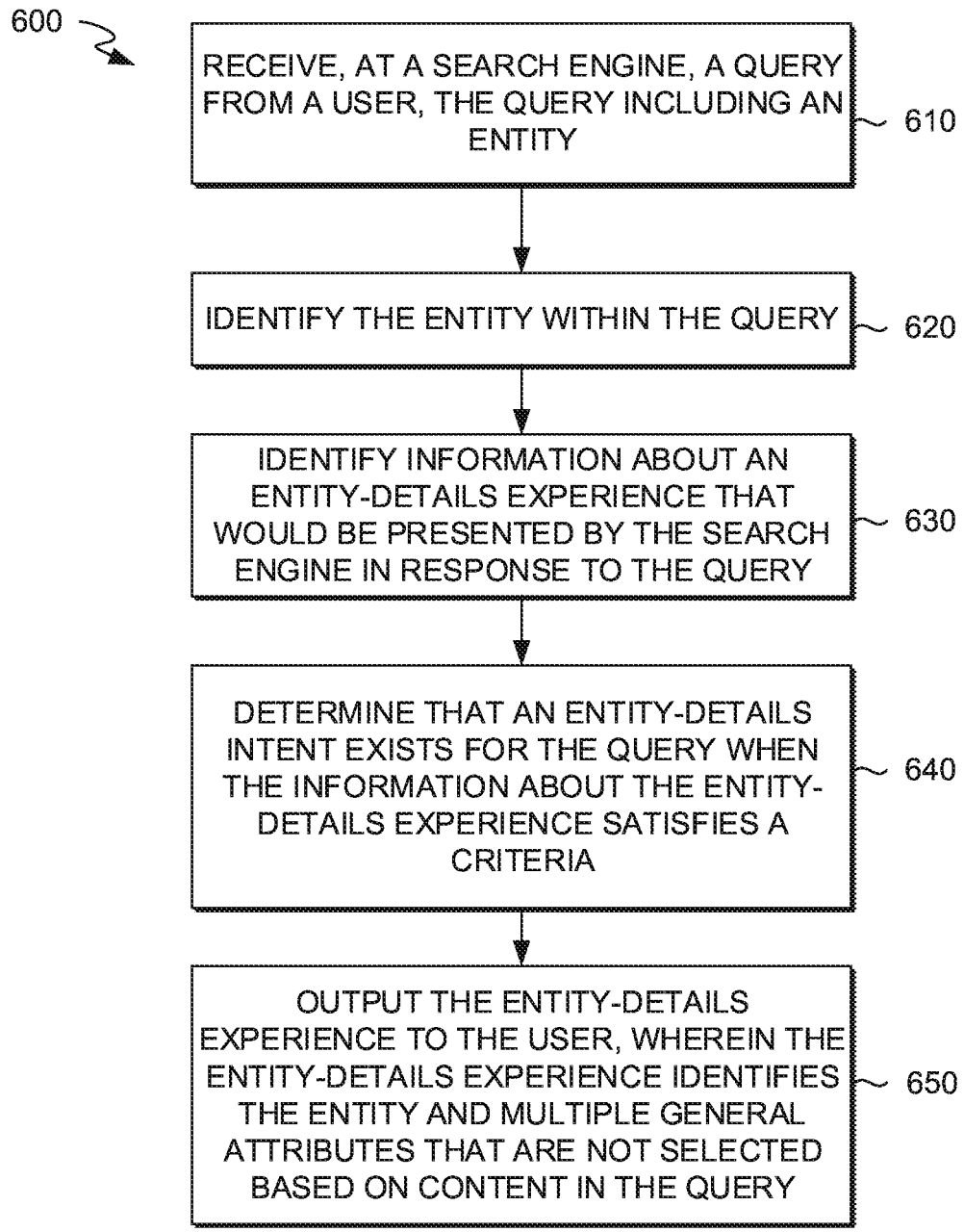

FIG. 6 is a flow chart showing a method 600 for providing relevant search result content in an experience format that is optimized to a query, in accordance with an aspect of the technology described herein.

At step 610, a query from a user is received from a user at a search engine. The query includes an entity. For example, the query could be, "what are the names of Hamilton cast members?" In this example, the musical Hamilton is the entity. In one aspect, an entity is only considered to be "in the query" if it is explicitly recited, as with Hamilton above. In contrast, "names" refers to cast members, who are entities, but the cast members are not considered entities for the purpose of this technology because they are not listed by their individual names. Broadly, an entity can be a noun. An entity can be a person, place, thing, philosophy, feeling, health condition, mental state, or the like. Practically, the technology may only identify entities listed in a knowledge base or some other source. Thus, a query including the name of a person who is not well-known may not be identified as an entity.

At step 620, the entity within the query is identified. An entity can refer to a type of person such as an author, politician, or sports player; a type of product such as a movie, book, or a consumer good; or a type of place such as a restaurant, hotel, recreation area, or retail store. Entity identification can use machine learning. Different machine learning technologies may be used, such as with conditional random fields. In one aspect, domain-based identifiers are used. Each domain-based identifier is trained to recognize different types of entities. One identifier could be trained to recognize people, another businesses, another books, another movies, etc.

At step 630, information about an entity-details experience that would be presented by the search engine in response to the query is identified. The information can include the title of the experience, content in the experience, and the like.

At step 640, an entity-details intent is determined to exist for the query because the information about the entity-details experience satisfies a criteria. The first criteria can be whether a title of the entity experience matches the query. If the title matches the query, then an entity-details intent is found. The match may be exact, n-gram based, and/or account for misspellings using a minimal edit distance.

The second criteria determines whether a similarity score that quantifies the similarity between the content of entity experience and the content of Q&A experience is within a threshold closeness. If the similarity score is above a threshold, then an entity-details intent is found. The entity experience often includes more features, thus, the similarity score could be based on an amount of content within the Q&A experience that is also in the entity experience. In other words, the similarity score may be generated in a way that does not penalize the entity experience for having additional content.

At step 650, an entity-details experience to the user is output. The entity-details experience identifies the entity and multiple general attributes that are not selected based on content in the query. An exemplary entity-details experience has been described previously with reference to FIG. 4.

Figure 7:
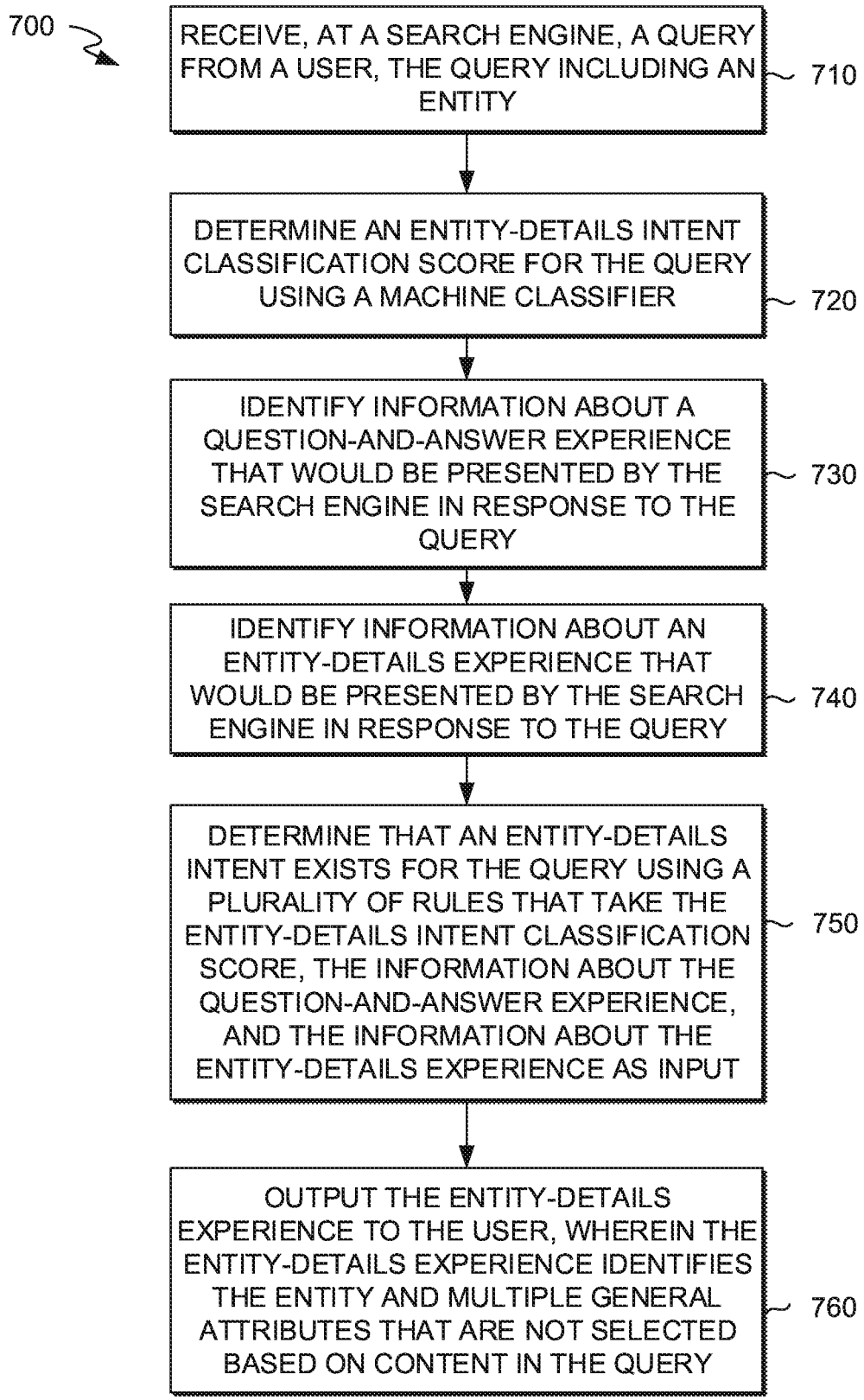

FIG. 7 is a flow chart showing a method 700 for providing relevant search result content in an experience format that is optimized to a query, in accordance with an aspect of the technology described herein.

At step 710, a query from a user is received at a search engine. The query includes an entity. For example, the query could be, "what are the names of Hamilton cast members?" In this example, the musical Hamilton is the entity. In one aspect, an entity is only considered to be "in the query" if it is explicitly recited, as with Hamilton above. In contrast, "names" refers to cast members, who are entities, but the cast members are not considered entities for the purpose of this technology because they are not listed by their individual names. Broadly, an entity can be a noun. An entity can be a person, place, thing, philosophy, feeling, health condition, mental state, or the like. Practically, the technology may only identify entities listed in a knowledge base or some other source. Thus, a query including the name of a person who is not well-known may not be identified as an entity.

At step 720, an entity-details intent classification score is determined for the query using a machine classifier. The machine classification system can be a neural network, support vector machine (SVP), or use some other technology. Essentially, the score is a measure of how closely the query matches training queries labeled as having an entity-details intent. The machine classification system is trained using queries labeled as having an entity-details intent or not having an entity-details intent. Once trained, the machine classification system can assign an intent classification score to an unlabeled query. The intent classification score can be a confidence score indicating a degree of confidence the machine classification system assigns to the query that an entity-details experience should be shown in response to the query. Conceptually, a high score means that the new query has a high level of similarity to training data labeled with an entity-details intent. A low score means the opposite.

At step 730, information about a question-and-answer experience that would be presented by the search engine in response to the query is identified. The information can include a source from which the question-and-answer experience in generated, a classification for the source, and other information. The information can also include a category or type of question-and-answer experience generated. The type can be form-based, for example, lists, or content category-based, such as healthcare related.

At step 740, information about an entity-details experience that would be presented by the search engine in response to the query is identified. The information can include the title of the experience, content in the experience, and the like.

At step 750, an entity-details intent is determined to exist for the query using a plurality of rules that take the entity-details intent classification score, the information about the question-and-answer experience, and the information about the entity-details experience as input. The plurality of rules can include use of an intent score generated by a classifier and other rules that do not use the intent score.

In one aspect, two different intent-score based rules are used to determine whether an entity-details intent exists. If either of the two intent-score based rules determines that entity-details intent exists, then an available Q&A experience is not presented and only the entity-details experience is presented. As described subsequently, other rules that do not rely on the intent score may be used to determine that entity-details intent exists.

The first intent-score based rule takes the intent score from the classifier, usage information about the intent experience that could be shown in response to the query, and information about the Q&A experience that could be shown in response to the query as input. The information about the Q&A experience is a type classification. Q&A experiences can be classified as many different types. Two types of particular interest are health information and lists. A health type of Q&A experience provides information related to a medical condition. For example, symptoms of scarlet fever may be presented in a Q&A experience in response to a query "scarlet fever." A list of top grossing movies may be presented as a Q&A experience in response to a query "top 10 movies of 2018." Other types of Q & A experiences include technical information, financial information, date and time information, and weather. An exemplary date and time query could be, "when is Labor Day?"

In one aspect, the first intent-score-based rule requires three different criteria to be met in order to find that an entity-details intent exists. First, the intent score from the classifier needs to be above a high threshold score. This score is described as "high" in relation to the lower threshold used in the second rule. Second, the search engine usage data must show that the entity experience has been presented previously in response to a similar query. Third, the Q&A experience type must not be on a white list. The white list includes Q&A experience types that should always be shown, which means that an entity-details intent should not be found. The white list can include at least the health type, time/date, and list type of experiences. If all three criteria are satisfied, then an entity-details intent is found.

The second intent-score-based rule uses the same input as the first, however, instead of the Q&A experience type, the rule uses the Q&A experience source. In one aspect, the second intent-score based rule requires three different criteria to be met in order to find that an entity-details intent exists. First, the intent score from the classifier needs to be above a medium threshold score. This score is described as "medium" in relation to the higher threshold used in the first rule. The medium threshold may be set to be above a range that defines an ambiguous intent. For example, 0.6 (on a 0 to 1 scale) could be the medium threshold. In other words, the classifier shows an entity-details intent, but the signal does not need to be strong. Second, the search engine usage data must show that the entity experience has been presented previously in response to a similar query. Third, the source of the Q&A experience must not be classified as a curated reference source, such as Wikipedia or IMDB. The technology described herein can use a list of curated reference sources and use a lookup function to determine if this third aspect of the rule is satisfied. In another aspect, if the entity-experience and the Q&A experience are from the same source, then the source of the Q&A experience is classified as a curated reference source. If all three criteria are satisfied, then an entity-details intent is found.

In addition to the intent-score-based rules described previously, content-based rules may be used to determine that an entity-details intent exists. In one aspect, two different content-based rules are used to determine whether an entity-details intent exists. If either of the two content-based rules determines that entity-details intent exists, then an available Q&A experience is not presented and only the entity-details experience is presented. Optionally, the intent score could be used with either content-based rule in the form of a low-threshold. The content-based rules form a strong presumption that the entity-details intent is present, thus, a lower threshold (than the previously described high and medium thresholds) could be used.

The first content-based rule determines whether a title of the entity experience matches the query. If the title matches the query, then an entity-details intent is found. The match may be exact, n-gram based, and/or account for misspellings using a minimal edit distance.

The second content-based rule generates a similarity score that quantifies the similarity between the content of entity experience and the content of Q&A experience. If the similarity score is above a threshold, then an entity-details intent is found. The entity experience often includes more features, thus, the similarity score could be based on an amount of content within the Q&A experience that is also in the entity experience. In other words, the similarity score may be generated in a way that does not penalize the entity experience for having additional content.

Thus, aspects of the technology may use four different rules to find an entity-details intent. If any one or more of the rules is satisfied, then the intent is found. The rules may be evaluated in series or in parallel. If in series, then subsequent rules in the series need not be evaluated when a precedent rule finds an entity-details intent. If in parallel, then processing of other rules may stop when a rule finds an entity-details intent.

At step 760, an entity-details experience to the user is output. The entity-details experience identifies the entity and multiple general attributes that are not selected based on content in the query. An exemplary entity-details experience has been described previously with reference to FIG. 4.

Figure 8:
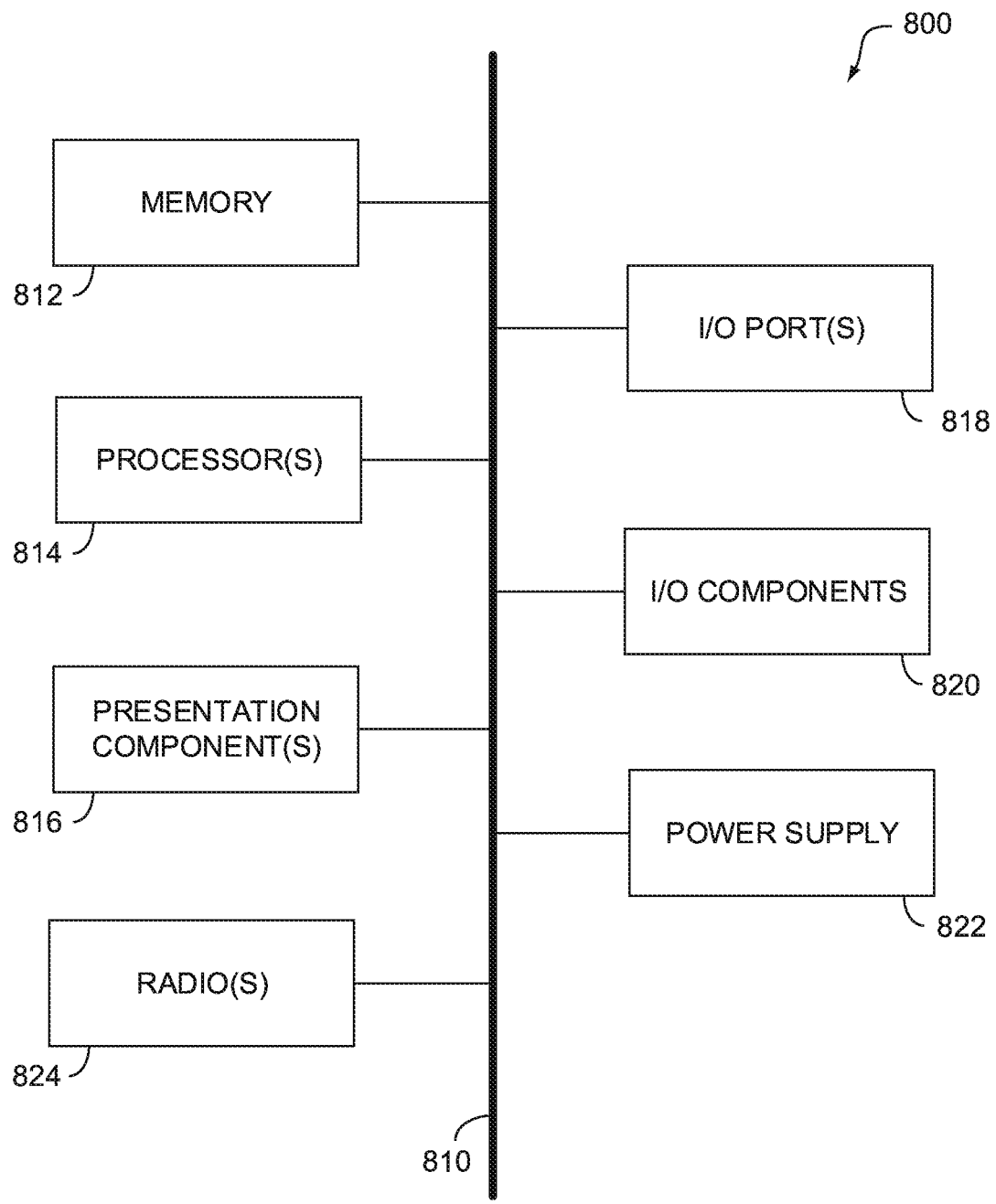
FIG. 8 is a block diagram of an exemplary computing environment suitable for use in implementing an aspect of the technology.

With reference to FIG. 8, computing device 800 includes a bus 810 that directly or indirectly couples the following devices: memory 812, one or more processors 814, one or more presentation components 816, one or more input/output (I/O) ports 818, one or more I/O components 820, and an illustrative power supply 822. Bus 810 represents what may be one or more busses (such as an address bus, data bus, or combination thereof). Although the various blocks of FIG. 8 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 8 is merely illustrative of an exemplary computing device that can be used in connection with one or more aspects of the present technology. Distinction is not made between such categories as "workstation," "server," "laptop," "handheld device," etc., as all are contemplated within the scope of FIG. 8 and with reference to "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer-storage media and communication media.

Computer-storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 800. Computer storage media does not comprise signals per se.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 812 includes computer storage media in the form of volatile and/or nonvolatile memory. The memory may be removable, non-removable, or a combination thereof. Exemplary hardware devices include solid-state memory, hard drives, optical-disc drives, etc. Computing device 800 includes one or more processors 814 that read data from various entities such as memory 812 or I/O components 820. Presentation component(s) 816 presents data indications to a user or other device. Exemplary presentation components include a display device, speaker, printing component, vibrating component, and the like.

The I/O ports 818 allow computing device 800 to be logically coupled to other devices, including I/O components 820, some of which may be built in. Illustrative components include a microphone, joystick, game pad, satellite dish, scanner, printer, wireless device, etc.

The I/O components 820 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 800. The computing device 800 may be equipped with depth cameras, such as stereoscopic camera systems, infrared camera systems, RGB camera systems, and combinations of these, for gesture detection and recognition. Additionally, the computing device 800 may be equipped with accelerometers or gyroscopes that enable detection of motion. The output of the accelerometers or gyroscopes may be provided to the display of the computing device 800 to render immersive augmented reality or virtual reality.

Some aspects of computing device 800 may include one or more radio(s) 824 (or similar wireless communication components). The radio 824 transmits and receives radio or wireless communications. The computing device 800 may be a wireless terminal adapted to receive communications and media over various wireless networks. Computing device 800 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Many different arrangements of the various components depicted, as well as components not shown, are possible without departing from the scope of the claims below. Aspects of the present technology have been described with the intent to be illustrative rather than restrictive. Alternative aspects will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

What is claimed is:

1. A method for providing relevant search result content in an experience format that is optimized to a query, comprising:
   receiving, at a search engine, a query from a user, the query including an entity;
   determining an entity-details intent classification score for the query using a machine classifier;
   identifying information about a question-and-answer experience that would be presented by the search engine in response to the query;
   determining that an entity-details intent exists for the query when the entity-details intent classification score is above a threshold score and the information about the question-and-answer experience satisfies a type criteria; and
   outputting an entity-details experience to the user, wherein the entity-details experience identifies the entity and multiple general attributes that are not selected based on content in the query.

2. The method of claim 1, wherein said criteria includes the question-and-answer experience not matching a plurality of question-and-answer types.

3. The method of claim 2, wherein the plurality of question-and-answer types include a healthcare response and a list response.

4. The method of claim 1, wherein said criteria includes the question-and-answer experience not being generated from a source on a forbidden source list.

5. The method of claim 4, wherein the forbidden source list includes educational reference documents.

6. The method of claim 1, wherein the method further comprises training the machine classifier using labeled edge case training queries that are identified using a preliminary classifier trained using a small set of labeled training queries, wherein the small set comprises less than 1/10 a number of total training queries used to train the machine classifier.

7. The method of claim 1, wherein the method further comprises determining that the query does not match a specific query within a hotfix list, wherein the hotfix list includes one or more specific queries that should not be assigned an entity-experience intent.

8. A method for providing relevant search result content in an experience format that is optimized to a query comprising:
   receiving, at a search engine, a query from a user, the query including an entity;
   identifying the entity within the query;
   identifying information about an entity-details experience that would be presented by the search engine in response to the query;
   identifying information about a question-and-answer experience that would be presented by the search engine in response to the query;
   determining that an entity-details intent exists for the query when the information about the entity-details experience or the information about a question-and-answer experience satisfies a type criteria; and
   outputting the entity-details experience to the user, wherein the entity-details experience identifies the entity and multiple general attributes that are not selected based on content in the query.

9. The method of claim 8, wherein the type criteria includes the entity exactly matching a title of the entity-details experience.

10. The method of claim 8, wherein the type criteria is a similarity score between content in the question-and-answer experience having greater than a threshold similarity to content in the entity-details experience.

11. The method of claim 8, further comprising:
    determining an entity-details intent classification score for the query using a machine classifier; and
    wherein the type criteria comprises the entity-details intent classification score being above a threshold score and the question-and-answer experience not matching a plurality of question-and-answer types on a list that causes the entity-details intent not to be found to exist.

12. The method of claim 8, further comprising:
    determining an entity-details intent classification score for the query using a machine classifier; and
    wherein the type criteria comprises the entity-details intent classification score being above a threshold score and the question-and-answer experience not being generated from a source on a forbidden source list that causes the entity-details intent not to be found to exist.

13. The method of claim 12, wherein the machine classifier is a support vector machine.

14. The method of claim 12, wherein the question-and-answer experience includes a subset of content about the entity that is selected from a full set of content about the entity based on terms in the query different from terms that identify the entity.

15. The method of claim 8, wherein the method further comprises determining that the query does not match a specific query within a hotfix list, wherein the hotfix list includes one or more specific queries that should not be assigned an entity-experience intent.

16. One or more computer storage media that, when executed by a computing device, causes the computing device to providing a relevant search result content in an experience format that is optimized to a query, the method comprising:
    receiving, at a search engine, a query from a user, the query including an entity;
    determining an entity-details intent classification score for the query using a machine classifier;
    identifying information about a question-and-answer experience that would be presented by the search engine in response to the query;
    identifying information about an entity-details experience that would be presented by the search engine in response to the query;
    determining that an entity-details intent exists for the query using a plurality of type rules that take the entity-details intent classification score, the information about the question-and-answer experience, and the information about the entity-details experience as input; and
    outputting the entity-details experience to the user, wherein the entity-details experience identifies the entity and multiple general attributes that are not selected based on content in the query.

17. The media of claim 16, wherein one of the plurality of type rules comprises the entity-details intent classification score being above a threshold score and the question-and-answer experience not matching a plurality of question-and-answer types on a list that causes the entity-details intent not to be found to exist.

18. The media of claim 16, wherein one of the plurality of type rules comprises the entity-details intent classification score being above a threshold score and the question-and-answer experience not being generated from a source on a forbidden source list that causes the entity-details intent not to be found to exist.

19. The media of claim 16, wherein one of the plurality of type rules comprises the entity exactly matching a title of the entity-details experience.

20. The media of claim 19, wherein one of the plurality of type rules comprises a similarity score between content in the question-and-answer experience having greater than a threshold similarity to content in the entity-details experience.

* * * * *